United States Patent [19]

Kiriyama et al.

[11] Patent Number: 5,177,175
[45] Date of Patent: Jan. 5, 1993

[54] FIBER OF WHOLLY AROMATIC COPOLYAMIDE FROM 2,6-NAPHTHALENE DICARBOXYLIC ACID AND 3,4'-DIAMINODIPHENYLETHER

[75] Inventors: Tsutomu Kiriyama; Toshihiro Santa, both of Matsuyama, Japan

[73] Assignee: Teijin Limited, Osaka, Japan

[21] Appl. No.: 604,061

[22] Filed: Oct. 26, 1990

[30] Foreign Application Priority Data

Oct. 30, 1989 [JP] Japan .................................. 1-279894

[51] Int. Cl.$^5$ .............................................. C08G 69/32
[52] U.S. Cl. .................................... 528/183; 528/190; 528/338; 528/339; 528/340; 528/344; 528/348
[58] Field of Search ............... 528/183, 344, 190, 338, 528/339, 340, 348

[56] References Cited

U.S. PATENT DOCUMENTS 4,075,172  2/1978  Ozawa et al. ........................ 528/183
4,355,151  10/1982  Shimada et al. ..................... 528/183

Primary Examiner—Harold D. Anderson
Attorney, Agent, or Firm—Burgess, Ryan & Wayne

[57] ABSTRACT

A wholly aromatic copolymer and a shaped article thereof having an excellent mechanical property, high resistances to heat and chemicals, and a satisfactory processability, is composed of (1) an aromatic dicarbonyl moiety consisting of recurring dicarbonyl units (A) and (B):

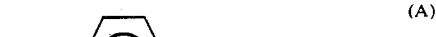

(A)

and

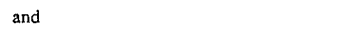

(B)

and (2) an aromatic diamine moiety consisting of recurring diamine units (C) and (D):

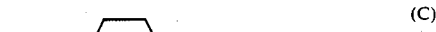

(C)

and

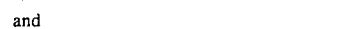

(D)

and the recurring dicarbonyl units (B) being in an amount of 0.01 molar % or more but less than 20 molar % based on the total molar amount of the dicarbonyl moiety (1), and the recurring diamine units (D) being in an amount of 60 molar % or less but more than 20 molar % based on the total molar amount of the diamine moiety (2).

3 Claims, No Drawings

FIBER OF WHOLLY AROMATIC COPOLYAMIDE FROM 2,6-NAPHTHALENE DICARBOXYLIC ACID AND 3,4'-DIAMINODIPHENYLETHER

BACKGROUND OF THE INVENTION

1) Field of the Invention

The present invention relates to a wholly aromatic copolyamide and a shaped article thereof. More particularly, the present invention relates to a wholly aromatic copolyamide and a shaped article thereof, especially a fiber, having excellent mechanical properties, for example, tensile strength, ultimate elongation and tensile modulus, high resistances to heat and chemicals, a satisfactory solubility in organic solvents, and a good processability and workability.

2) Description of the Related Arts

It is known that conventional wholly aromatic polyamides (aramids) have an excellent high tensile strength and modulus and a high heat-resistance, and thus are useful for forming various shaped articles, for example, fibers and films. Especially, a para-type aramid resin, i.e., poly-p-phenylene terephthalamide (PPTA) is useful, as a typical aramid resin, for industrial materials and protective materials in which the above-mentioned properties are effectively utilized.

Nevertheless, industrial materials must have not only a high tensile strength but also a high ultimate elongation, and thus the conventional para-type aramid resins are not always satisfactory as industrial materials.

Many attempts have been made to overcome the disadvantages of the conventional para-type aramid resins. For example, Japanese Unexamined Patent Publication No. 62-263,320 discloses fibers comprising a blend of an aromatic copolyamide prepared by copolymerization of p-phenylene diamine, terephthalic acid, and an aromatic diamine or dicarboxylic acid monomer having a naphthalene ring structure, with poly-p-phenylene naphthalamide.

Also, Japanese Unexamined Patent Publication No. 63-75,111 discloses aromatic polyamide fibers comprising a copoly-(p-phenylene terephthalamide/2,6-naphthalamide) containing copolymerized 2,6-naphthaldiamine in an amount of 5 to 10 molar %.

The inventions disclosed in the above-mentioned Japanese publications effectively eliminate the disadvantage, i.e., a low ultimate elongation, of the conventional shaped PPTA articles, for example, fibers, but difficulties arise in the production and shaping processes of the PPTA resin and copolymerized or modified PPTA resins, due to a high rigidity of the polymeric molecules thereof. For example, in the preparation of a uniform solution of the PPTA or copolymerized or modified PPTA resin as a polymerization reaction medium for the resin, hexamethylphosphortriamide, which is harmful to the human body and other living bodies, or an organic polar solvent mixture containing a metal salt, for example, calcium dichloride or lithium chloride, must be used in a large amount of 9% by weight or more, as disclosed in Japanese Unexamined Patent Publication No. 62-263,320. Alternatively, a specific organic polar solvent containing 4% by weight or more of a metal salt, for example, calcium dichloride, as mentioned in Japanese Unexamined Patent Publication No. 63-75,111, must be used as a polymerization reaction medium. Even if this type of copolymerization reaction medium effectively dissolves the polymer, the resultant polymer solution is gelled, and thus the copolymerization process must be carried out by utilizing a specific technique for handling a gelled material having substantially no mobility or fluidity. Further, in the shaping process, for example, a spinning or film-forming process, the gelled polymer solution cannot be used as a shaping dope solution. Namely, the polymer must be dissolved in concentrated sulfuric acid to provide a liquid crystalline dope solution for the shaping or spinning, i.e., a liquid crystal-shaping or spinning process must be carried out. When this process is utilized, a large amount of a neutralizing agent must be employed to neutralize the sulfuric acid in the dope solution, and this neutralizing procedure unavoidably causes the resultant product to be undesirably contaminated with inorganic ions derived from the neutralizing agent, and thus the quality of the product is lowered. Also, the use of the concentrated sulfuric acid causes the operational environment to be dangerously polluted and the shaping apparatus to be corroded, and thus is disadvantageous from the viewpoint of industrial convenience.

To eliminate the above-mentioned disadvantages due to the polymerization medium, several attempts have been made to utilize a popular organic polar solvent to provide an isotropic shaping (spinning) dope solution, and to make the shaping (spinning) procedure simple and easy. Particularly, the solubility of the polyamide resin is enhanced by introducing ether bonds (—O—) into the molecular chains of the polyamide, as disclosed, for example, in Japanese Unexamined Patent Publication Nos. 51-76,386, 51-134,743, 51-136,916, 61-252,229, 62-27,431, 62-225,530, 62-177,022 and 62-177,023 and Japanese Examined Patent Publication No. 53-32,838.

In those prior references, the wholly aromatic copolyamide consisting of a copolymerization product of p-phenylene diamine (PPDA) and 3,4'-diamino phenylether 3,4'-DAPE) with an aromatic dicarboxylic acid component has an excellent mechanical strength, rigidity and chemical resistance, and is capable of being dissolved by N-methyl-2-pyrrolidone, which is a popular organic polar solvent and useful as a polymerization reaction medium. Also, the resultant copolyamide solution obtained from the copolymerization reaction in the polymerization medium, can be directly utilized as a doping solution for various shaping (spinning) processes.

The introduction of the ether bond into the polymeric molecular chain effectively causes the resultant polymeric molecular chains to become flexible and the resultant copolymer to exhibit the above-mentioned advantages, but the resultant copolymer article is disadvantageous in that it has an unsatisfactory mechanical strength and elongation property.

Under these circumstances, a wholly aromatic polyamide having not only a high mechanical strength, satisfactory elongation property, and good heat resistance, but also a high solubility in popular organic solvents and able to be produced by a polymerization process such that the resultant polymer solution therefrom can be directly utilized as a dope solution for various shaping (spinning) process, has not been realized.

Japanese Examined Patent Publication No. 53-32,838 discloses wholly aromatic copolyamides which are copolymerization products of a dicarboxylic acid component consisting of terephthalic acid and 2,6-naphthalene dicarboxylic acid with a diamine component consisting of p-phenylenediamine and 3,4'-diaminodiphenylether.

The wholly aromatic copolyamides disclosed in the Japanese publication are preferably limited to those having a content of copolymerized 2,6-naphthalene dicarboxylic acid component of 20 to 80 molar % based on the total molar amount of the dicarboxylic component and a component of copolymerized 3,4'-diaminodiphenylether of 15 to 80 molar % based on the total molar amount of the diamine component.

Also, Japanese Unexamined Patent Publication No. 61-195,123 and 62-27,431 discloses reaction catalysts and additives for the polymerization of aromatic dicarboxylic acids with aromatic diamines. The aromatic dicarboxylic acids include terephthalic acid and 2,6-naphthalene dicarboxylic acid. The aromatic diamines include p-phenylene diamine and 3,4'-diaminodiphenylether.

Nevertheless, those three Japanese Publications failed to disclose specific aromatic copolyamides which are soluble in a popular organic polar solvent and can be produced by a copolymerization process in the solvent such that the resultant copolyamide solution can be directly utilized as a dope solution for a shaping or spinning process, and which can be converted to a shaped article having an excellent mechanical strength and ultimate elongation not obtainable by the conventional copolyamide articles.

SUMMARY OF THE INVENTION

An object of the present invention is to provide a wholly aromatic copolyamide which is soluble in organic polar solvents which are harmless to the human body and other living bodies and can be prepared by a polymerization process in the solvent such that the resultant copolyamide solution derived therefrom can be directly utilized as a doping solution for a shaping or spinning process and exhibits a stable shaping or spinning property, and which is useful for producing shaped articles, for example, fibers or films, having excellent mechanical properties, especially a very high tensile strength and a high ultimate elongation.

The above-mentioned objection can be attained by the wholly aromatic copolyamide of the present invention which comprises an aromatic dicarbonyl moiety consisting of the recurring dicarbonyl units of the formulae (A) and (B):

(A)

and

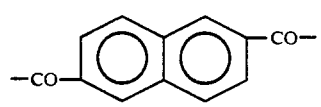

(B)

and an aromatic diamine moiety in a substantially equimolar amount to the aromatic dicarbonyl moiety and consisting of the recurring diamine unit of the formulae (C) and (D):

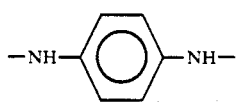

(C)

-continued and

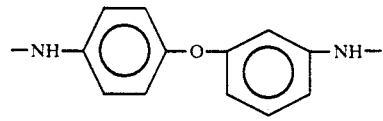

(D)

said recurring dicarbonyl units of the formula (B) being in an amount of 0.01 molar % or more but less than 20 molar % based on the total molar amount of the aromatic dicarbonyl moiety, and said recurring diamine units of the formula (D) being in an amount of 60 molar % or less but more than 20 molar % based on the total molar amount of the aromatic diamine moiety.

DESCRIPTION OF THE PREFERRED EMBODIMENTS

In the search by the inventors of the present invention for wholly aromatic copolyamides which can be prepared by a copolymerization process in a harmless copolymerization medium such that the resultant copolyamide solution therefrom can be directly utilized as a dope solution for a shaping or spinning process, it was discovered that, when the aromatic dicarbonyl component contains a specific content of 2,6-naphthalene dicarbonyl dichloride in addition to terephthaloyl dichloride, and the aromatic diamine component contains a specific content of 3,4'-diaminodiphenylether in addition to p-phenylene diamine, the resultant aromatic copolyamide resin can be converted to shaped articles, especially fibers or filaments, having superior mechanical properties, for example, tensile strength and ultimate elongation. The present invention was completed on the basis of this discovery.

In the wholly aromatic copolyamide of the present invention, the aromatic dicarbonyl moiety consists of the aromatic recurring divalent dicarbonyl units of the formulae (A) and (B)

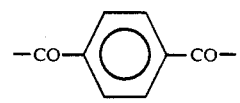

(A)

and

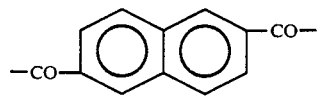

(B)

The dicarbonyl units (A) are derived from copolymerized terephthaloyl dischloride and the dicarbonyl units (B) are derived from copolymerized 2,6-naphthalene dicarbonyl dichloride and in a content of 0.01 molar % or more but less than 20 molar %, preferably from 0.05 molar % to 15 molar %, based on the total molar content of the aromatic dicarbonyl moiety.

Also, the aromatic diamine moiety of the present invention consists of the aromatic recurring divalent diamine units of the formulae (C) and (D):

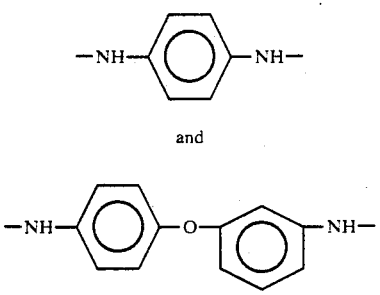

The diamine units (C) are derived from copolymerized p-phenylene diamine and the diamine units (D) are derived from copolymerized 3,4'-diaminodiphenylether and are in a content of 60 molar % or less but more than 20 molar %, preferably from 25 molar % to 55 molar %, based on the total molar content of the aromatic diamine moiety.

When the content of the dicarbonyl units (B) is less than 0.01 molar %, the resultant copolyamide is disadvantageous in that the solubility of the resultant copolyamide in organic solvent is unsatisfactory and the drawing property of the resultant spun, undrawn filaments is not sufficiently high.

Also, when the content of the dicarbonyl unit (B) is 20 molar % or more, the resultant copolyamide is disadvantageous in that, when a resultant copolyamide dope solution is shaped or spun and the shaped or spun dope solution stream is coagulated in a coagulating liquid comprising an aqueous solution of an organic polar solvent capable of dissolving the copolyamide therein, the amount of water diffused from the coagulating liquid into the coagulated shaped article or fiber becomes too large, and thus the resultant shaped article or fiber exhibits lowered physical properties; and the resultant copolyamide exhibits a reduced heat resistance and a lowered optimum heat-drawing temperature.

Further, when the content of the diamine units (D) is more than 60 molar %, the resultant copolyamide is disadvantageous in that it has a reduced heat resistance and a lowered optimum heat drawing temperature.

Furthermore, when the content of the diamine units (D) is 20 molar % or less, the resultant copolyamide is disadvantageous in that the solubility of polyamide in organic polar solvent is remarkably reduced.

The wholly aromatic copolyamide of the present invention having the above-mentioned specific constitution exhibits a high solubility in a copolymerization medium and has a high degree of polymerization, and the resultant shaped articles therefrom exhibit an excellent mechanical strength and a high ultimate elongation, and thus are industrially useful.

The wholly aromatic copolyamide of the present invention preferably has an intrinsic viscosity ($\eta_{inh}$) of 2.0 or more, determined at a concentration of 0.5 g/100 ml in a 98% sulfuric acid at a temperature of 30° C. If the intrinsic viscosity is less than 2.0, the resultant shaped articles, for example, fibers, sometimes exhibit an unsatisfactory tensile strength and ultimate elongation.

The wholly aromatic copolyamide of the present invention is useful for various shaped articles, especially fibers or filaments and films.

When the wholly aromatic copolyamide of the present invention is converted to fibers, the resultant fibers preferably have a tensile strength of 28.5 g/d or more and a ultimate elongation of 3.5% or more.

The shaped article can be produced from one type of copolyamide of the present invention or a blend of two or more types of copolyamides of the present invention.

The wholly aromatic copolyamide of the present invention can be produced by a direct polymerization, interfacial polymerization or solution polymerization method. The polymerization reaction medium usable for the above-mentioned copolymerization method usually comprises, as a principal component, at least one member selected from dimethylformamide, dimethylacetamide, N-methylpyrrolidone, N-methylcaprolactam, dimethylsulfon, tetramethyl urea, and N,N'-dimethyl-2-imidazolinone, which are well known as harmless organic polar solvents.

Optionally, to increase the solubility of the medium for the copolyamide, a conventional metal salt is added in a certain amount to the medium before, during or after the polymerization procedure.

The metal salt usable for the above-mentioned purpose are preferably selected from lithium chloride and calcium chloride.

Usually, in the copolymerization process, the dicarboxylic acid component for the dicarbonyl moiety is used in a substantially equimolar amount to the diamine component for the diamine moiety. But if necessary, for example, to control the degree of polymerization of the resultant copolyamide, one of the dicarboxylic acid and diamine components is used in a larger molar amount than the other one of the components. Also, a terminal-blocking agent consisting of at least one member selected from monofunctional carboxylic acid and amine compounds may be added to the copolymerization system.

Usually, the dicarboxylic acid compounds usable for the present invention are in the form of dicarboxylic acid chlorides. Therefore, the reaction of the dicarboxylic acid chlorides with the diamine generates, as a by-product, hydrogen chloride, which is a strong acid. Therefore, to neutralize the generated hydrogen chloride, a neutralizing agent comprising at least one member selected from aliphatic and aromatic amines and quaternary ammonium salt compounds is usually added to the copolymerization system.

When the copolymerization procedure is completed, optionally the resultant copolymerization mixture is further neutralized by adding an inorganic alkaline material comprising at least one member selected from sodium hydroxide, potassium hydroxide, calcium hydroxide and calcium oxide.

In the copolymerization process, it is important to control the concentration of the resultant copolyamide in the copolymerization medium to a desired level. To produce a copolyamide having a high and uniform degree of polymerization, it is preferable to control the concentration of the copolyamide to a level of 15% by weight or less. Especially, when controlled to a concentration of from several % to about 10% by weight, the copolyamide can be produced under a stable condition.

There is no specific limitation of the copolymerization conditions, but usually, the polymerization reaction of the dicarboxylic acid halide with the diamine is fast, and thus the reaction temperature is preferably controlled to a level of from −25° C. to 100° C., more preferably from −10° C. to 80° C.

As will be obvious to a person skilled in this art, a contamination of the copolymerization system with foreign matter, for example, water, which will hinder the copolymerization reaction, should be avoided.

Also, as long as the solubility of the copolymerization medium for the resultant copolyamide can be maintained at a high level, the copolymerization procedure may be carried out in a manner that will effectively promote a formation of a block copolymer, for example, at least one member of the dicarboxylic acid component and the diamine component may be added individually in two or more operations to the copolymerization system.

Also, two more types of copolyamides of the present invention different from each other can be separately produced and then blended with each other, to provide an aromatic copolyamide resin of the present invention.

The resultant copolyamide solution from the above-mentioned copolymerization process can be directly used as a dope solution for a shaping or spinning process.

Alternatively, the resultant copolyamide solution is poured into a non-solvent, for example, an aliphatic alcohol or water, to form precipitates in the form of pulp particles, and the precipitates are collected. The collected precipitates can be dissolved in a solvent, to prepare a dope solution for a shaping or spinning process.

As repeatedly mentioned above, the aromatic copolyamide of the present invention is characterized by the specific feature that the solubility thereof in the copolymerization medium is very high, and thus the copolyamide can be produced without precipitation in the copolymerization medium and the resultant copolyamide solution can be directly employed as a dope solution for a shaping or spinning process.

In an example of the shaping method for the aromatic copolyamide of the preset invention, the aromatic copolyamide resin in the form of pulp particles or fine particles is press-formed into a desired form. In another example, a dope solution of the aromatic copolyamide is converted to a thin film or membrane by a spreading method or a casting method.

In still another example, the dope solution of the aromatic copolyamide is converted to a fiber or film by a wet spinning method or a wet film-forming method.

In the wet-spinning or film-forming process, the dope solution of the aromatic copolyamide is extruded through a spinning orifice or a slit-shaped film-forming orifice, the extruded dope solution stream is introduced into a coagulation liquid to solidify the dope solution stream, and the solidified fiber or film is washed with water, and optionally, drawn and heat-treated. Usually the coagulating liquid comprises a mixture of an organic polar solvent capable of dissolving the aromatic copolyamide with a non-solvent for the copolyamide, for example, water.

The shaped articles, for example, fibers or films, of the aromatic copolyamide of the present invention have excellent mechanical properties, for example, tensile strength, ultimate elongation and tensile modulus, and a satisfactory heat resistance and chemical resistance.

Especially, in the drawn fiber-producing process, the aromatic copolyamide of the present invention can be drawn at a very high draw ratio, for example, 10 or more, and thus the resultant drawn fibers exhibit a very high tensile strength of 28.5 g/d or more. Further, the resultant drawn fibers exhibit a high ultimate elongation of 3.5% or more, and have a high heat resistance.

The specifically limited contents of the recurring dicarbonyl unit (B) (which are derived from copolymerized 2,6-naphthalene dicarboxylic acid) and the recurring diamine units (D) (which are derived from copolymerized 3,4'-diaminodiphenyl ether) are unexpectedly effectively allow the drawing process for the aromatic copolyamide fibers of the present invention to be carried out at a very high draw ratio as mentioned above, and thus obtain aromatic copolyamide fibers having a very high tensile strength and ultimate elongation.

The reasons for the above-mentioned specific properties of the aromatic copolyamide of the present invention are not completely clear, but it is assumed that the specific contents of the recurring dicarbonyl units (B) and the recurring diamine units (D) cause the irregularity of the molecular chains of the resultant copolyamide and thus the flexibility and intermolecular slippage of the copolyamide molecules to be enhanced, and the intensity and frequency of hydrogen bonds between the polymeric molecules to be lowered.

EXAMPLES

The present invention will be further explained by way of specific examples, which in no way limit the scope of the present invention.

In the examples, the "part" and "%" are in part by weight and % by weight.

The intrinsic viscosity number ($\eta_{inh}$) of a polyamide which corresponds to a degree of polymerization of the polymer, was determined at a concentration of 0.5 g/100 ml in a 98% sulfuric acid at a temperature of 30° C., by a usual operation.

The turbidity of a polyamide solution, which is a parameter of transparency of the solution, was determined in such a manner that the polyamide solution was placed in a test glass tube having an inside diameter of 25 mm. heated in a constant temperature bath at a temperature of 100° C., and then degassed by a centrifugal separator. Thereafter, the test glass tube was placed in the front of a black board and the polyamide solution in the test glass tube was observed by the naked eye to determine whether the solution was transparent or turbid.

The viscosity of a polyamide solution was determined by a falling ball viscometer in a constant temperature bath at a temperature of 100° C., using a steel ball (SUS 314).

EXAMPLE 1

A completely dried three necked flask equipped with a stirrer was charged at room temperature with a mixture of 1880.02 parts of N-methyl pyrrolidone (NMP) with a diamine component consisting of 30.5960 parts (60 molar %) of p-phenylene diamine (PPDA) and 37.7692 parts (40 molar %) of 3,4'-diaminodiphenylether (3,4'-DAPE), and the mixture was converted to a clear solution in a nitrogen gas atmosphere. Then, a dicarboxylic acid component consisting of 86.1647 parts (90 molar %) of terephthalic acid dichloride (TPC) and 11.9349 parts (10 molar %) of 2,6-naphthalene dicarboxylic acid dichloride (2,6-NDC) was dissolved in the solution in the flask, while stirring. The resultant solution was subjected to a copolymerization procedure at a temperature of from 40° C. to 60° C. With a lapse of the copolymerization time, the viscosity of the solution was gradually increased, and after a final heating operation at a temperature of 80° C. for 60 minutes, a viscous copolyamide solution having a high transparency was obtained.

The copolyamide solution was neutralized by adding 154.81 parts of an NMP slurry containing 22.5% by weight of calcium hydroxide.

A sample of the resultant copolyamide was collected from the neutralized copolyamide solution by precipitation, and subjected to the logarithmic viscosity ($\eta_{inh}$) measurement. The measured intrinsic viscosity number of the copolyamide was 3.30.

The neutralized copolyamide solution was placed in a cylinder equipped with a spinneret having 25 spinning holes with a diameter of 0.30 mm, and extruded through the spinning holes at a spinning temperature of 100° C., and the extruded filamentary copolyamide solution streams were introduced into a coagulating liquid consisting of an aqueous solution of 30% of NMP. The distance between the extruding faces of the spinneret and the surface of the coagulating liquid was 10 mm. This wet spinning process will be referred to as a "dry jet spinning process" hereinafter.

The coagulated filaments were withdrawn from the coagulating liquid, washed with water, dried, and then drawn in two steps on a first heating plate at a temperature of 300° C. and then on a second heating plate at a temperature of 500° C., at a total draw ratio of 18.2.

The resultant filament yarn had a yarn count of deniers/25 filaments.

Surprisingly, the resultant drawn copolyamide filaments had a tensile strength of 35.2 g/d, an ultimate elongation of 4.4%, and a tensile modulus of g/d.

The test results are shown in Table 1.

EXAMPLES 2 AND 3

In each of Examples 2 and 3, the same procedures as in Example 1 were carried out, with the following exceptions.

In Example 2, the two step drawing procedures were carried out on a first heating plate at a temperature of 300° C. and then on a second heating plate at a temperature of 510° C., at a total draw ratio of 22.1. The resultant filament yarn had a yarn count of 34 d/25 filaments, and the resultant filaments had a tensile strength of 34.6 g/d, an ultimate elongation of 4.4%, and a tensile modulus of 670 g/d.

In Example 3, the two step drawing procedures were carried out on a first heating plate at a temperature of 300° C. and then on a second heating plate at a temperature of 520° C., at a total draw ratio of 25.6. The resultant drawn filament yarn had a yarn count of 34 d/25 filaments, and the resultant filaments had a tensile strength of 33.2 g/d, an ultimate elongation of 4.4%, and a tensile modulus of 661 g/d.

The test results are shown in Table 1.

COMPARATIVE EXAMPLE 1

The same procedures as in Example 1 were carried out, except that the dicarboxylic acid component did not contain 2,6-NDC.

The resultant copolyamide solution had a high transparency and the resultant copolyamide had an intrinsic viscosity number ($\eta_{inh}$) of 3.45.

The resultant copolyamide solution was subjected to the same dry jet spinning process as in Example 1, and the resultant filament yarn was drawn in the same manner as in Example 1, except that the total draw ratio was 10.5, because it was difficult to smoothly draw the filament yarn at a higher draw ratio than 10.5 without breakage of the filaments.

The resultant copolyamide filaments had a yarn count of 35 deniers/25 filaments, a tensile strength of 27.5 g/d, an ultimate elongation of 3.5%, and a tensile modulus of 600 g/d.

Note: The above-mentioned procedures are similar to those described in Example 4 of Japanese Examined Patent Publication No. 53-32,838, except for the intrinsic viscosity ($\eta_{inh}$), the total denier of the drawn filament yarn and the composition of the coagulating liquid.

In comparison with Example 1, the resultant undrawn copolyamide filaments could not be smoothly drawn at a high draw ratio of more than 10.5, for example, of 18.2, without breakage of the filaments, due to the absence of the dicarbonyl unit (B).

The test results are indicated in Table 2.

EXAMPLE 4

The same procedures as in Example 1 were carried out, with the following exceptions.

The copolymerization reaction mixture was prepared by dissolving an aromatic diamine component consisting of 24.6578 parts (50 molar %) of PPDA and 45.6582 parts (50 molar %) of 3,4'-DAPE in 1883.97 parts of NMP at room temperature, and admixing the resultant solution with an aromatic dicarboxylic acid component consisting of 83.3298 parts (90 molar %) of TPC and 11.5422 parts (10 molar %) of 2,6-NDC, while stirring.

The reaction mixture was subjected to copolymerization procedures at room temperature for 60 minutes, and then at a temperature of 80° C. for 60 minutes.

With a lapse of the copolymerization time, the viscosity of the reaction mixture was increased. The resultant copolyamide solution had a high transparency, and no turbidity was found in the solution.

After the copolymerization procedures, the resultant reaction mixture was neutralized by gradually adding 149.717 parts of a NMP solution containing 22.5% by weight of calcium hydroxide.

The resultant copolyamide had an intrinsic viscosity number ($\eta_{inh}$) of 3.16.

The two step drawing procedures were carried out in the same manner as in Example 1, except that the total draw ratio was 22.4. The resultant filament yarn had a yarn count of 37 d/25 filaments, and the individual filaments had a tensile strength of 30.6 g/d, an ultimate elongation of 4.4%, and a tensile modulus of 612 g/d.

The test results are shown in Table 1.

EXAMPLE 5

The same procedures as in Example 4 were carried out with the following exceptions.

The two step drawing procedures were carried out on a first heating plate at a temperature of 300° C. and then on a second heating plate at a temperature of 520° C., at a total draw ratio of 23.2.

The resultant filament yarn had a yarn count of 36 d/25 filaments, and the resultant individual filaments had a tensile strength of 30.3 g/d, an ultimate elongation of 4.3%, and a tensile modulus of 608 g/d.

The test results are shown in Table 1.

EXAMPLE 6

The same procedures as in Example 1 were carried out, with the following exceptions.

In the preparation of the copolyamide, 22.1920 parts (45 molar %) of PPDA, 41.0924 parts 45 molar %) of 3,4'-DAPE and 83.3298 parts (90 molar %) of TPC were subjected to a first copolymerization procedure in 1883.97 parts of NMP at a temperature of 40° C. for 60 minutes, the first copolymerization mixture was mixed with 2.46580 parts (5 molar %) of PPDA, 4.5658 parts (5 molar %) of 3,4'-DAPE and 11.5422 parts (10 molar %) of 2,6-NDC, and then the resultant mixture was subjected to a second copolymerization procedure at a temperature of 60° C. for 60 minutes.

The resultant copolyamide had an intrinsic viscosity number ($\eta_{inh}$) of 3.01.

The two step drawing procedures were carried out in the same manner as in Example, except that the temperature of the second heating plate was 510° C. and the total draw ratio was 14.8.

The resultant filament yarn had a yarn count of 31 d/25 filaments, and the individual filaments had a tensile strength of 32.7 g/d, an ultimate elongation of 4.1%, and a tensile modulus of 624 g/d.

In this example, it was confirmed that, even when the copolyamide prepared in the two step copolymerization process, the resultant copolyamide filaments had excellent mechanical properties. Also, it was confirmed that the copolyamide filaments can be drawn on the second heating plate at a temperature of about 600° C.

The test results are shown in Table 1.

EXAMPLE 7

The same procedures as in Example 6 were carried out with the following exceptions.

The two step drawing procedures were carried out on a first heating plate at a temperature of 300° C. and then on a second heating plate at a temperature of 520° C., at a total draw ratio of 17.7.

The resultant filament yarn had a yarn count of 34 d/25 filaments and the individual filaments had a tensile strength of 33.3 g/d, an ultimate elongation of 4.2%, and a tensile modulus of 630 g/d.

The test results are shown in Table 1.

EXAMPLE 8

The same procedures as in Example 1 were carried out, with the following exceptions.

A first copolyamide solution was prepared by dissolving 21.2388 parts (50 molar %) of PPDA, 39.3274 parts (50 molar %) of 3,4'-DAPE in 1900.06 parts of NMP, mixing the resultant solution with 99.4183 parts (100 molar %) of 2,6-NDC, while stirring, and subjecting the resultant reaction mixture to a first copolymerization procedure at a temperature of from 40° C. to 60° C. for 60 minutes.

The resultant first copolyamide solution was neutralized.

A second copolyamide solution was prepared in the same manner as in Comparative Example 1, from 25.1069 parts (50 molar %) of PPDA, 46.4897 parts (50 molar %) of 3,4'-DAPE and 94.2749 parts (100 molar %) of TPC. The resultant second copolyamide solution was neutralized.

The first copolyamide had an intrinsic viscosity number of 2.05.

The second copolyamide had an intrinsic viscosity number of 3.4.

A mixture of 200 parts of the first copolyamide solution with 1800 parts of the second copolyamide solution was placed in a polymerization reactor, and further copolymerized at a temperature of 80° C. for 5 hours, while vigorously stirring, and a clear, uniform, and thermally stable third copolyamide solution was obtained.

The third copolyamide had an intrinsic viscosity of 3.18.

The third copolyamide solution was converted to a drawn filament yarn having a yarn count of 37 d/25 filaments, in the same manner as in Example 1, except that, in the two step drawing procedures, the second heating plate had a temperature of 520° C. and the total draw ratio was 15.4.

The resultant individual filaments had a tensile strength of 30.5 g/d, an ultimate elongation of 4.3%, and a tensile modulus of 627 g/d.

In this example, it was confirmed that, even when the copolyamide was prepared by the three step copolymerization method as mentioned above, the resultant copolyamide filaments had excellent mechanical properties.

EXAMPLE 9

The same procedures as in Example 8 were carried out, with the following exceptions.

The two step drawing procedures were carried out on a first heating plate at a temperature of 300° C. and then on a second heating plate at a temperature of 540° C., at a total draw ratio of 22.4.

The resultant filament yarn had a yarn count of 34 d/25 filaments, and the individual filaments had a tensile strength of 31.2 g/d, an ultimate elongation of 4.3%, and a tensile modulus of 635 g/d.

The test results are shown in Table 1.

EXAMPLE 10

The same procedures as in Example 1 were carried out, with the following exceptions.

The copolyamide was prepared by dissolving 25.0612 parts (50 molar %) of PPDA and 46.4052 parts (50 molar %) of 3,4'-DAPE in 1882,07 parts of NMP at room temperature, mixing the resultant solution with 93.1625 parts (99 molar %) of TPC and 1.1731 parts (1 molar %) of 2,6 NDC, while stirring, and subjecting the resultant reaction mixture to a copolymerization process at room temperature for 60 minutes and then at a temperature of 80° C. for 60 minutes.

The resultant copolyamide solution was viscous and had a high transparency. The copolyamide solution was gradually neutralized with 152.166 parts of a NMP solution of 22.5% by weight of calcium hydroxide.

The resultant copolyamide had an intrinsic viscosity number of 3.39.

In the two step drawing procedures, the total draw ratio was 16.0.

The resultant filament yarn had a yarn count of 37 d/25 filaments, and the individual filaments had a tensile strength of 28.9 g/d, an ultimate elongation of 4.0%, and a tensile modulus of 618 g/d.

In this example, it was confirmed that even when the dicarbonyl units (B) was in a small content of 1 molar %, the resultant copolyamide could be subjected to strict drawing procedures at a very high drawing ratio of 16.0 at a high temperature of 540° C., and the resultant copolyamide filaments had excellent mechanical properties.

EXAMPLE 11

The same procedures as in Example 10 were carried out, with the following exceptions.

In the preparation of the copolyamide solution, 25.0612 parts (50 molar %) of PPDA and 46.4052 parts (50 molar %) of 3,4'-DAPE were dissolved in 1882.07 parts of NMP at room temperature; the resultant solution was supplemented with 94.0094 parts (99.9 molar %) of TPC and 0.1173 parts (0.1 molar %) of 2,6-NDC, while stirring; and the resultant mixture was subjected to a copolymerization procedure in the same manner as in Example 1.

After the neutralization, the resultant copolyamide had an intrinsic viscosity number of 3.81.

In the two step drawing procedures, the total draw ratio was 16.0.

The resultant filament yarn had a yarn count of 35 d/25 filaments, and the individual filaments had a tensile strength of 28.7 g/d, an ultimate elongation of 4.0%, and a tensile modulus of 603 g/d.

In this example, it was confirmed that, even when the dicarbonyl units (B) were in a small content of 0.1 molar %, the resultant copolyamide can be subjected to a strict drawing process at a high draw ratio of 16.0 at a high temperature of 540° C., and the resultant copolyamide filaments had excellent mechanical properties, in comparison with those of Comparative Example 1.

EXAMPLE 12

The same procedures as in Example 1 were carried out, with the following exceptions.

In the preparation of the copolyamide solution, 33.4049 parts (65 molar %) of PPDA and 33.3066 parts (35 molar %) of 3,4'-DAPE were dissolved in 1879.08 parts of NMP at room temperature; the resultant solution was mixed with 82.0144 parts (85 molar %) of TPC and 18.0424 parts (15 molar %) of 2,6-NDC, while stirring, and the resultant mixture was subjected to a copolymerization procedure in the same manner as in Example 1.

After the neutralization, the resultant copolyamide had an intrinsic viscosity number of 2.97.

In the two step drawing procedures, the total draw ratio was 15.1.

The resultant filament yarn had a yarn count of 34 d/25 filaments, and the individual filaments had a tensile strength of 28.6 g/d, an ultimate elongation of 4.0%, and a tensile modulus of 594 g/d.

The test results are indicated in Table 1.

EXAMPLE 13

The same procedures as in Example 1 were carried out, with the following exceptions.

In the preparation of the copolyamide, 24.8803 parts (50 molar %) of PPDA and 46.0702 parts (50 molar %) of 3,4'-DAPE were dissolved in 1882.92 parts of NMP at room temperature, the resultant solution was mixed with 88.7530 parts (95 molar %) of TPC and 5.8232 parts (5 molar %) of 2,6-NDC, and the resultant mixture was subjected to a copolymerization procedure as in Example 1.

After the neutralization, the resultant copolyamide had an intrinsic viscosity number of 3.29.

In the two step drawing procedure, the total draw ratio was 18.7.

The resultant filament yarn had a yarn count of 31 d/25 filaments, and the individual filaments had a tensile strength of 29.3 g/d, ultimate elongation of 4.0%, and a tensile modulus of 623 g/d.

EXAMPLE 14

The same procedures as in Example 1 were carried out, with the following exceptions.

In the preparation of the copolyamide, 41.7119 parts (78 molar %) of PPDA and 21.7847 parts (22 molar %) of 3,4'-DAPE were dissolved in 1882.92 parts of NMP together with 18.7418 parts of calcine-dried calcium chloride at room temperature, the resultant solution was mixed with 82.3290 parts (82 molar %) of TPC and 22.5291 parts (18 molar %) of 2,6-NDC, and the resultant mixture was subjected to a copolymerization procedure as in Example 1.

After the neutralization, the resultant copolyamide had an intrinsic viscosity number of 2.95.

In the two step drawing procedures, the total draw ratio was 19.2.

The resultant filament yarn had a yarn count of 37 d/25 filaments, and the individual filaments had a tensile strength of 27.5 g/d, an ultimate elongation of 3.6%, and a tensile modulus of 64.5 g/d.

COMPARATIVE EXAMPLE 2

The same procedures as in Example 1 were carried out with the following exceptions.

In the preparation of the copolyamide, 31.1725 parts (60 molar %) of PPDA and 38.4809 parts (40 molar %) of 3,4'-DAPE were dissolved in 1877.76 parts of NMP at room temperature, the resultant solution was mixed with 97.5426 parts (100 molar %) of TPC, while stirring, and the resultant mixture was subjected to the same copolymerization procedure as in Example 1.

It was found that, immediately after the start of the polymerization reaction, the reaction mixture became significantly turbid, and even though the copolymerization was carried out for 60 minutes, a clear copolyamide solution was not obtained.

This copolymerization product could not be employed as a dope solution for the dry jet spinning process.

COMPARATIVE EXAMPLE 3

The same procedures as in Example 1 were carried out, with the following exceptions.

In the preparation of the copolyamide, 18.8094 parts (30 molar %) of PPDA and 81.2673 parts (70 molar %) of 3,4'-DAPE were dissolved in 1852.48 parts of NMP at room temperature, the resultant solution was mixed with 94.1709 parts (80 molar %) of TPC and 29.3487 parts (20 molar %) of 2,6-NDC, and the resultant mixture was subjected to a copolymerization procedure as in Example 1.

After the neutralization, the resultant copolyamide had an intrinsic viscosity number of 3.27.

In the two step drawing procedure, the total draw ratio was 12.6.

The resultant filament yarn had a yarn count of 36 d/25 filaments, and the individual filaments had a tensile strength of 24.5 g/d, an ultimate elongation of 4.1%, and a tensile modulus of 574 g/d.

In this comparative example, it was confirmed that, although the two step drawing procedure was carried out at a high total draw ratio of 12.6, the mechanical properties of the resultant filaments were inferior to those of the above-mentioned examples.

The test results are shown in Table 2.

COMPARATIVE EXAMPLE 4

The same procedures as in Example 1 were carried out, with the following exceptions.

In the preparation of the copolyamide, 35.5896 parts (70 molar %) of PPDA and 28.2430 parts (30 molar %) of 3,4'-DAPE were dissolved in 1880.38 parts of NMP at room temperature, the resultant solution was mixed with 66.8185 parts (70 molar %) of TPC and 35.6987 parts (30 molar %) of 2,6-NDC, and the resultant mixture was subjected to a copolymerization procedure as in Example 1.

It was found that, immediately after the start of the polymerization reaction, the reaction mixture became significantly turbid, and even after the copolymerization for 60 minutes, a clear copolyamide solution was not obtained. Also, even when the resultant copolymerization mixture was neutralized, it remained opaque.

This copolymerization product could not be employed for the filament-producing process.

COMPARATIVE EXAMPLE 5

The same procedures as in Example 1 were carried out, with the following exceptions.

In the preparation of the copolyamide, 22.6336 parts (50 molar %) of PPDA and 41.9101 parts (50 molar %) of 3,4'-DAPE were dissolved in 1893.49 parts of NMP at room temperature, the resultant solution was mixed with 33.9952 parts (40 molar %) of TPC and 63.5684 parts (60 molar %) of 2,6-NDC, and the resultant mixture was subjected to a copolymerization procedure as in Example 1.

After the neutralization, the resultant copolyamide had an intrinsic viscosity number of 2.54.

In the two step drawing procedures, the temperature of the second heating plate was 340° C. and the total draw ratio was 7.2.

The resultant filament yarn had a yarn count of 25 d/25 filaments, and the individual filaments had a tensile strength of 9.3 g/d, an ultimate elongation of 2.4%, and a tensile modulus of 457 g/d.

In the drawing procedures for the copolyamide filament, the draw ratio was limited to a low level of less than 10, and the resultant drawn filament had an unsatisfactory tensile strength of less than 28.5 g/d and a poor ultimate elongation of less than 3.5%.

The test results are indicated in Table 2.

COMPARATIVE EXAMPLE 6

The same procedures as in Example 1 were carried out, with the following exceptions.

In the preparation of the copolyamide, 34.6948 parts (95 molar %) of PPDA, 3.3812 parts (5 molar %) of 3,4'-DAPE, 54.8538 parts (80 molar %) of TPC and 17.0953 parts (20 molar %) of 2,6-NDC were mixed in a solution of 76.5629 parts of calcine-dried lithium chloride in 1914.07 parts of NMP at room temperature, and the resultant mixture was subjected to a copolymerization procedure as in Example 1.

It was found that the copolymerization mixture became extremely turbid, and 20 minutes after the start of the copolymerization reaction, was gelled to an extent such that the stirring operation could not be carried out for this copolymerization mixture.

The copolymerization reaction was terminated by neutralizing the copolymerization mixture.

The resultant copolymerization mixture could not be employed as a dope solution for the dry jet spinning process, due to the very high viscosity thereof.

COMPARATIVE EXAMPLE 7

The same procedures as in Comparative Example 6 were carried out with the following exceptions.

In the preparation of the copolyamide, 31.0304 parts (90 molar %) of PPDA, 6.3842 parts (10 molar %) of 3,4'-DAPE, 38.8391 parts (60 molar %) of TPC and 32.2783 parts (40 molar %) of 2,6-NDC were mixed in a solution of 76.7552 parts of calcine-dried lithium chloride in 1918.88 parts of NMP at room temperature, and the resultant mixture was subjected to a copolymerization procedure as in Example 1.

It was found that the copolymerization mixture became turbid and very viscous. Therefore, the resultant copolymerization product could not be satisfactorily degassed and it was not possible to employ same as a dope solution for the dry jet spinning process.

COMPARATIVE EXAMPLE 8

The same procedures as in Comparative Example 6 were carried out, with the following exceptions.

In the preparation of the copolyamide, PDDA was used in an amount of 42.9212 parts (80 molar %) and 3,4'-DAPE was employed in an amount of 19.8690 parts (20 molar %).

The resultant copolymerization mixture was very turbid and viscous, and thus could not be used as a dope solution for the dry jet spinning process.

TABLE 1

| Example No. | Item Content of recurring unit (molar %) Dicarbonyl unit A | B | Diamine unit C | D | Turbidity of polymer solution | $\eta_{inh}$ | Falling ball viscosity (poise) | Two step drawing procedure Second drawing temperature (°C.) | Total draw ratio | Filament Tensile strength (g/d) | Ultimate elongation (%) | Tensile modulus (g/d) | Note |
|---|---|---|---|---|---|---|---|---|---|---|---|---|---|
| Example | | | | | | | | | | | | | |
| 1 | 90 | 10 | 60 | 40 | Transparent | 3.30 | 1691 | 500 | 18.2 | 35.2 | 4.4 | 682 | |
| 2 | 90 | 10 | 60 | 40 | " | 3.30 | 1691 | 510 | 22.1 | 34.6 | 4.4 | 670 | |
| 3 | 90 | 10 | 60 | 40 | " | 3.30 | 1691 | 520 | 25.6 | 33.2 | 4.4 | 661 | |
| 4 | 90 | 10 | 50 | 50 | " | 3.16 | 1086 | 500 | 22.4 | 30.6 | 4.4 | 612 | |
| 5 | 90 | 10 | 50 | 50 | " | 3.16 | 1086 | 520 | 23.2 | 30.3 | 4.3 | 608 | |
| 6 | 90 | 10 | 50 | 50 | " | 3.01 | 1067 | 510 | 14.8 | 32.7 | 4.1 | 624 | Two step polymerization |
| 7 | 90 | 10 | 50 | 50 | " | 3.01 | 1067 | 520 | 17.7 | 33.3 | 4.2 | 630 | Two step polymerization |
| 8 | 90 | 10 | 50 | 50 | " | 3.18 | 1424 | 520 | 15.4 | 30.5 | 4.3 | 627 | Three step |

TABLE 1-continued

| Example No. | Item Content of recurring unit (molar %) Dicarbonyl unit A | B | Diamine unit C | D | Turbidity of polymer solution | $\eta_{inh}$ | Falling ball viscosity (poise) | Two step drawing procedure Second drawing temperature (°C.) | Total draw ratio | Filament Tensile strength (g/d) | Ultimate elongation (%) | Tensile modulus (g/d) | Note |
|---|---|---|---|---|---|---|---|---|---|---|---|---|---|
| 9 | 90 | 10 | 50 | 50 | " | 3.18 | 1424 | 540 | 22.4 | 31.2 | 4.3 | 635 | polymerization Three step polymerization |
| 10 | 99 | 1 | 50 | 50 | " | 3.39 | 3916 | 540 | 16.0 | 28.9 | 4.0 | 618 | |
| 11 | 99.9 | 0.1 | 50 | 50 | " | 3.81 | 5874 | 540 | 16.0 | 28.7 | 4.0 | 603 | |
| 12 | 85 | 15 | 65 | 35 | " | 2.97 | 2537 | 500 | 15.1 | 28.6 | 4.0 | 594 | |
| 13 | 95 | 5 | 50 | 50 | " | 3.29 | 2619 | 520 | 18.7 | 29.3 | 4.0 | 623 | |
| 14 | 82 | 18 | 78 | 22 | " | 2.95 | 2715 | 520 | 19.2 | 27.5 | 3.6 | 645 | CaCl₂ added |

TABLE 2

| Example No. | Item Content of recurring unit (molar %) Dicarbonyl unit A | B | Diamine unit C | D | Turbidity of polymer solution | $\eta_{inh}$ | Falling ball viscosity (poise) | Two step drawing procedure Second drawing temperature (°C.) | Total draw ratio | Filament Tensile strength (g/d) | Ultimate elongation (%) | Tensile modulus (g/d) | Note |
|---|---|---|---|---|---|---|---|---|---|---|---|---|---|
| Comparative Example | | | | | | | | | | | | | |
| 1 | 100 | 0 | 50 | 50 | Transparent | 3.45 | 1050 | 520 | 10.5 | 27.5 | 3.5 | 600 | |
| 2 | 100 | 0 | 60 | 40 | Turbid | — | — | — | — | — | — | — | |
| 3 | 80 | 20 | 30 | 70 | Transparent | 3.27 | 973 | 470 | 12.6 | 24.5 | 4.1 | 574 | |
| 4 | 70 | 30 | 70 | 30 | Turbid | 1.46 | — | — | — | — | — | — | |
| 5 | 40 | 60 | 50 | 50 | Transparent | 2.54 | 906 | 340 | 7.2 | 9.3 | 2.4 | 457 | |
| 6 | 80 | 20 | 95 | 5 | Turbid | 1.52 | — | — | — | — | — | — | LiCl-added |
| 7 | 60 | 40 | 90 | 10 | Turbid | 2.36 | — | — | — | — | — | — | LiCl-added |
| 8 | 80 | 20 | 80 | 20 | Turbid | 2.25 | — | — | — | — | — | — | |

We claim:

1. A wholly aromatic copolyamide fiber comprising a wholly aromatic copolyamide consisting essentially of an aromatic dicarbonyl moiety consisting of the recurring dicarbonyl units of the formulae (A) and (B):

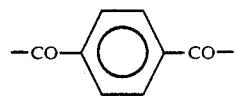
(A)

and

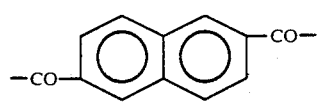
(B)

and an aromatic diamine moiety in a substantially equimolar amount to the aromatic dicarbonyl moiety and consisting of the recurring diamine units of the formulae (C) and (D):

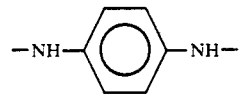
(C)

and

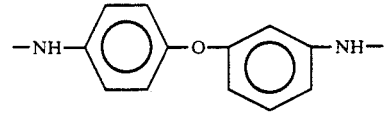
(D)

said recurring dicarbonyl units of the formula (B) being in an amount of 0.05 molar % to 15 molar % based on the total molar amount of the aromatic dicarbonyl moiety, and said recurring diamine units of the formula (D) being in an amount of 60 molar % but more than 20 molar % based on the total molar amount of the aromatic diamine moiety, said fiber having a tensile strength of 28.5 g/d or more.

2. The aromatic copolyamide fiber as claimed in claim 1, wherein said aromatic copolyamide has an intrinsic viscosity number ($\eta_{inh}$) of 2.0 or more, determined at a concentration of 0.5 g/100 ml in a 98% sulfuric acid at a temperature of 30° C.

3. The aromatic copolyamide fiber as claimed in claim 1, which has an ultimate elongation of 3.5% or more.

* * * * *